Sept. 6, 1960 F. G. DANHIER 2,951,931
AUTOMATIC ARC WELDING PROCESS, EQUIPMENT AND ELECTRODE
Filed Jan. 22, 1957 5 Sheets-Sheet 1

INVENTOR
FRANCOIS G. DANHIER
BY
ATTORNEYS

Sept. 6, 1960 F. G. DANHIER 2,951,931
AUTOMATIC ARC WELDING PROCESS, EQUIPMENT AND ELECTRODE
Filed Jan. 22, 1957 5 Sheets-Sheet 2

INVENTOR
FRANCOIS G. DANHIER
BY
ATTORNEYS

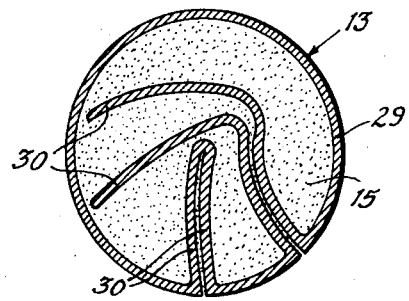
Fig. 7.
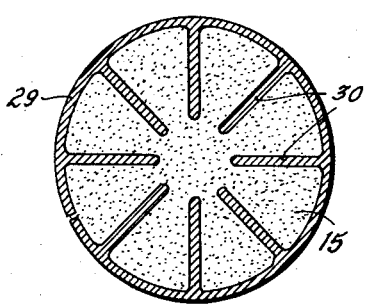
Fig. 8.
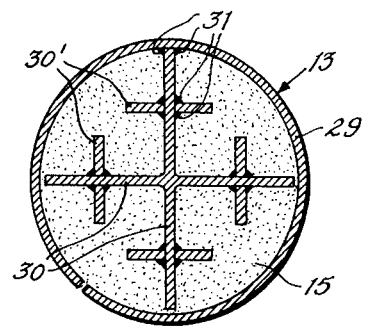
Fig. 9.
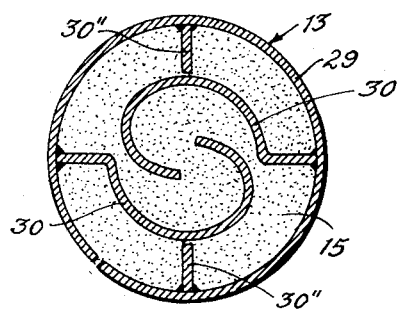
Fig. 10.
INVENTOR
FRANCOIS G. DANHIER
BY
ATTORNEYS

United States Patent Office 2,951,931
Patented Sept. 6, 1960

2,951,931

AUTOMATIC ARC WELDING PROCESS, EQUIPMENT AND ELECTRODE

Francois Georges Danhier, Anderlecht (Brussels), Belgium, assignor to La Soudure Electrique Autogene, S.A., Brussels, Belgium, a corporation of Belgium Filed Jan. 22, 1957, Ser. No. 635,239

Claims priority, application Belgium Apr. 23, 1956

6 Claims. (Cl. 219—73)

The invention concerns a process for automatic welding by means of an electric arc under a protective atmosphere of carbon dioxide, using a continuous metallic core-type electrode with a particular composition of the core.

This application has been divided and the subject matter relating to the welding and to the process of welding with copper elements has been embodied in divisional application Serial No. 727,898, filed April 1, 1958, for Process and Device to Retain in Position the Liquid Metal in Automatic Visible Arc Welding in 3 O'clock Butt Joints.

The manual welding process generally uses coated electrodes, with the coating supplying a protective layer of molten slag covering the molten metal.

This slag has a metallurgical function and a physical one. It facilitates the production of a sound and ductile metal, and gives the weld bead a smooth shape of good appearance. The same qualities have been sought in automatic welding with a continuous electrode, but in this case the coating of the electrode had to be provided with a network of fine metallic wires flush with the outer surface and also in contact with the metallic core wire, in order to carry to the latter the electric current supplied by the contacts of the automatic welding machine.

Continuous braided electrodes of this type are difficult to manufacture and are costly. Furthermore, damage to the coating, resulting from its fragility and occurring during the passage of the electrode through the welding head, causes frequent operating troubles.

Uncoated electrodes have also been proposed for arc welding, in which the wire shows a narrow axial canal filled with a small amount of ionizing materials, generally potassium salts, intended to improve the arc stability. These ionizers constitute therefore inside the wire a core of very small diameter which contributes neither to deoxidize the deposited metal, nor to form a protective slag upon the same.

The process according to the invention provides a method for electric arc welding under an atmosphere of carbon dioxide and with a slag, without the difficulties present with coated electrodes.

In the process of the invention, a non-coated electrode is used, which contains a substantial core of granulated materials representing 24 to 42% of the weight of the metallic portion of the wire.

In this process, a non-coated electrode is therefore used, the core of which has a much larger cross-section than that of known tubular electrodes containing a small amount of ionizing materials. The ferro-alloys and particularly the reducing materials contained in the core of the electrode used as per the invention have the effect of quieting the pool of molten steel and of adding to it alloying elements if so desired.

During the development of the process of the invention, it was observed that most of the materials used in electrode coatings for manual welding are ill-suited to form the core of a continuous electrode, many difficulties resulting from their use, particularly large and abundant projections (spatter), a noisy fusion with sputtering and the formation of a coarsely rippled weld bead.

Research work showed however that certain core compositions give a very quiet fusion to the electrode, with very thin spatter even under heavy currents and with alternating welding current. The weld beads become very smooth, convex in cross section, and the slag pulls out very easily after cooling.

To obtain such results, an electrode is used having a core containing a mixture of deoxidizers and of materials forming a slag in the amount of 24 to 42% of the weight of the metallic shell. This mixture contains 4 to 20% of ferromanganese and other deoxidizers, and 75 to 96% of slag-forming materials. The latter materials are composed of 60 to 85% titanium oxide, 4 to 20% manganese monoxide, 8 to 25% silica, the balance consisting mainly of ferrous oxide, alumina, lime, magnesia and alkalies.

One of the preferred core compositions is the following:

| | Percent |
|---|---|
| Low-carbon ferromanganese (containing 80% manganese) | 12 |
| Slag-forming mixture | 88 |
| | 100 |

Composition of the slag-forming mixture:

| | |
|---|---|
| $TiO_2$ | 66 |
| $SiO_2$ | 19 |
| $MnO$ | 6 |
| $FeO + Al_2O_3 + CaO + MgO + Na_2O + K_2O$ | 9 |
| | 100 |

It is recommended that this core be free of moisture or combined water, of carbonates and other materials which could generate gases during the fusion. Preferably, the slag-forming mixture will be completely fused beforehand, taking the form of vitrous granules.

The electrode is made of a low-carbon steel shell containing the materials of the core.

Although the weight of the core can vary from 24 to 42% of the weight of the metallic shell, preference is generally given to a core of such dimensions as to represent 37% in weight of the weight of the metallic shell.

With the compositions indicated for the core, the viscosity and surface tension of the molten slag are relatively high. As a result, the liquid slag stays always at some distance behind the arc, leaving the fused metal uncovered under the electrode and thus subjecting it to contact with nitrogen from the air. Some nitriding of the molten metal will result, with the known harmful effects upon the quality of the weld. To avoid nitriding the molten metal, a protective gas must therefore be used to keep the surrounding air away from the molten metal until the latter is covered by the liquid slag. The best results so far have been obtained with carbon dioxide which has in addition a favorable effect upon the arc stability. This gas is generally delivered above the melting pool by a nozzle surrounding the wire-guide. The output of carbon dioxide is for instance from 1.3 to 10.6 gallons per minute when welding with currents averaging 250 to 750 amperes.

The fusion of the electrode is quieter under carbon dioxide protection than in the open air. The transfer of the molten metal is of the fine spray type and spatter is negligible.

In the process of the invention, the arc is visible and gives light to the welding path.

While welding with the electrode such as defined hereabove, the deposit metal originates nearly exclusively from the metallic shell and the slag is supplied in near totality by the core of the electrode.

Even though this electrode gives satisfactory welding results, it was observed that the fusion of this electrode under carbon dioxide is considerably improved simply by changing the structure of the electrode, the improvement consisting mainly in a very substantial reduction of spatter and sputter.

To realize such an improvement, the major portion of the metal of the electrode is no longer located in a thick-walled outside shell, but is concentrated in a group of internal projections or fins electrically connected to the shell. In other words, the weight of the internal metallic fins is greater than that of the shell-forming metal. The major portion of the metal of the electrode is therefore surrounded by the core powder inside said shell.

A better improvement of the fusion of the electrode is obtained when the internal fins are thin enough to have their cumulated extension longer than half the periphery of the outside shell. This assures a fair distribution of the metallic and electrically-conductive elements among the slag-forming materials which are the primary constituents of the core.

With a few slight changes, most automatic welding machines can operate by the process of the invention.

The process of the invention is quite particularly well-suited for the welding of horizontal joints between butt-assembled vertical plates, also called "3-o'clock welding."

Horizontal butt-welding in vertical planes is generally performed by manual welding. In the so-called 3-o'clock welding position, the molten metal tends to flow downward and in front of the joint. It is held in place only by its surface tension, which is sometimes too weak compared to the weight of the molten metal. The size of the molten pool which can be so supported is very small. This is why automatic arc welding, with its very high currents and large pools of molten metal, has been considered for a long time as being impractical for this type of welding.

Recently, however, thanks to the submerged arc welding process, 3 o'clock welding became possible under good conditions. In this process, the liquid metal is held in position by a layer of molten slag, itself supported by a dam of granular flux held in place by a portable support attached to the parts to be assembled.

Practical operations in these submerged arc welds offer numerous difficulties due to poor fit-up, lack of visibility of the joint and the problem of delivering and of holding granular flux against a vertical wall, and of recuperating the unused flux later. Furthermore, this process requires that the flux be perfectly dry, which prevents welding in the open when atmospheric conditions are unfavorable (fog, humid weather or rain).

In the present process, the composition of the slag-forming materials previously indicated is also such that surface tension of the weld metal under the slag is rather high. However, to hold up in place, in the 3-o'clock position, pools of large dimensions, some external support of the liquid metal may be needed. In such case, a movable metallic strip, preferably in copper, possibly cooled by water circulation, will be used to support and freeze the molten slag, thus providing a viscous support for the molten metal. Preferably, the strip will be located against the lower plate, parallel to the joint as such level as to have the upper edge of the strip distant from under the lower lip of the joint by 0.2 to 0.7 times the thickness of the lower plate. By this method, plates ½″ thick can be welded horizontally in butt joints between vertical plates, in one single pass.

Thanks to the visibility of the arc, the process can be used on poorly-fitted joints, since the operator can, during the operation, change the position of the electrode, the feed and the current intensity.

The strip may be held against the lower plate by various means. However, to perform welds of great lengths, the support may be made of sections of strip placed end to end. This support may also be made of adjacent copper plates attached to the links of an endless chain.

For easy operation of this form of the process of the invention, a welding machine can be used with advantage, comprising a welding head attached to a movable support travelling parallel to the joint, the same support also holding an endless chain parallel to the direction of travel, said chain carrying metallic strip sections taking position in succession under the joint being welded, to support the slag as it progresses along.

The invention also covers as a product or article a continuous electrode to operate the process of the invention, said electrode comprising a wire made of a metallic shell containing a core such as defined in the description of the process of the invention.

The drawings attached to the specification show diagramatically two forms of execution using the process of the invention, also a machine to apply the process and several electrodes according to the invention.

Figures 7 to 10 each show, in enlarged scale, a cross-section of various forms of the electrode as per the invention.

In all these figures, identical reference numbers designate identical elements.

Figure 2:
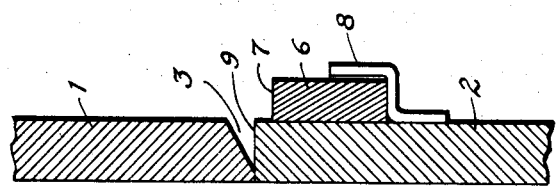
Figures 2 and 3 are vertical cross-sections by planes shown as 2—2 and 3—3 in Figure 1.
Figure 3:
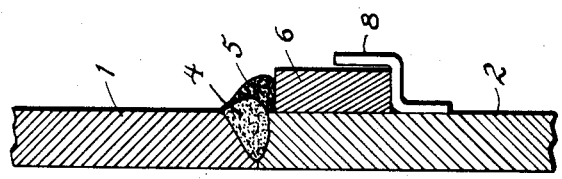
Figure 1:
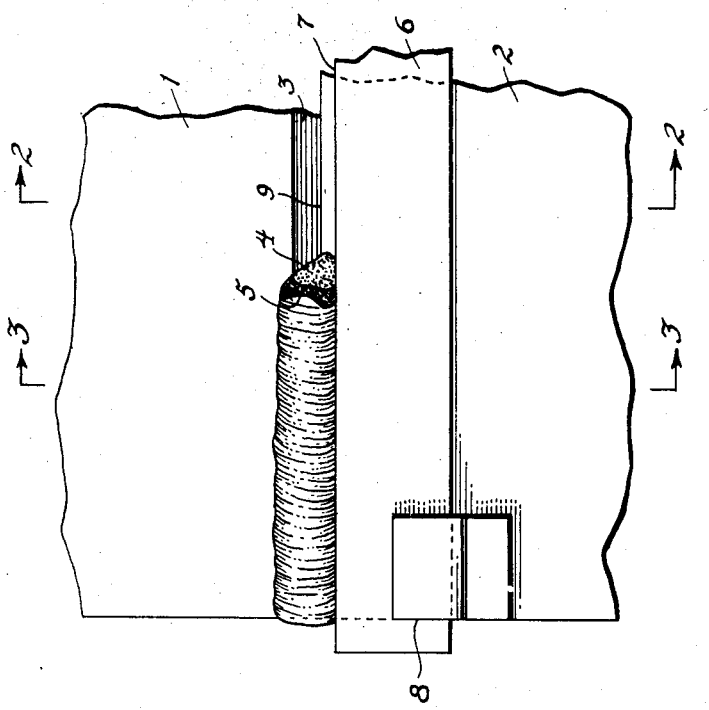
Figure 1 is a front view of a welding joint between two butt-assembled vertical plates, being welded by the process of the invention.

In Figures 1 to 3, 1 and 2 are butt-assembled vertical steel plates prepared for welding, 3 is the horizontal joint to be filled with weld metal, 4 is the weld bead already deposited, 5 is the slag covering said metal and 6 is a metallic strip, preferably in copper, which supported this slag while it was molten. In turn, the slag supported metal 4 while the latter was molten.

As it can be seen, the upper face 7 of said strip 6 pressed against the lower plate 2 is held in place by a support 8 slightly under the lower lip 9 of joint 3, at a distance about 0.3 times the thickness of said plate.

The electrode which was used to deposit the weld head 4 and slag 5 comprises, in a steel wire, a core as defined previously. The weld metal was deposited under a carbon dioxide protection keeping the metal from nitriding by the nitrogen of the surrounding air.

Figure 4:
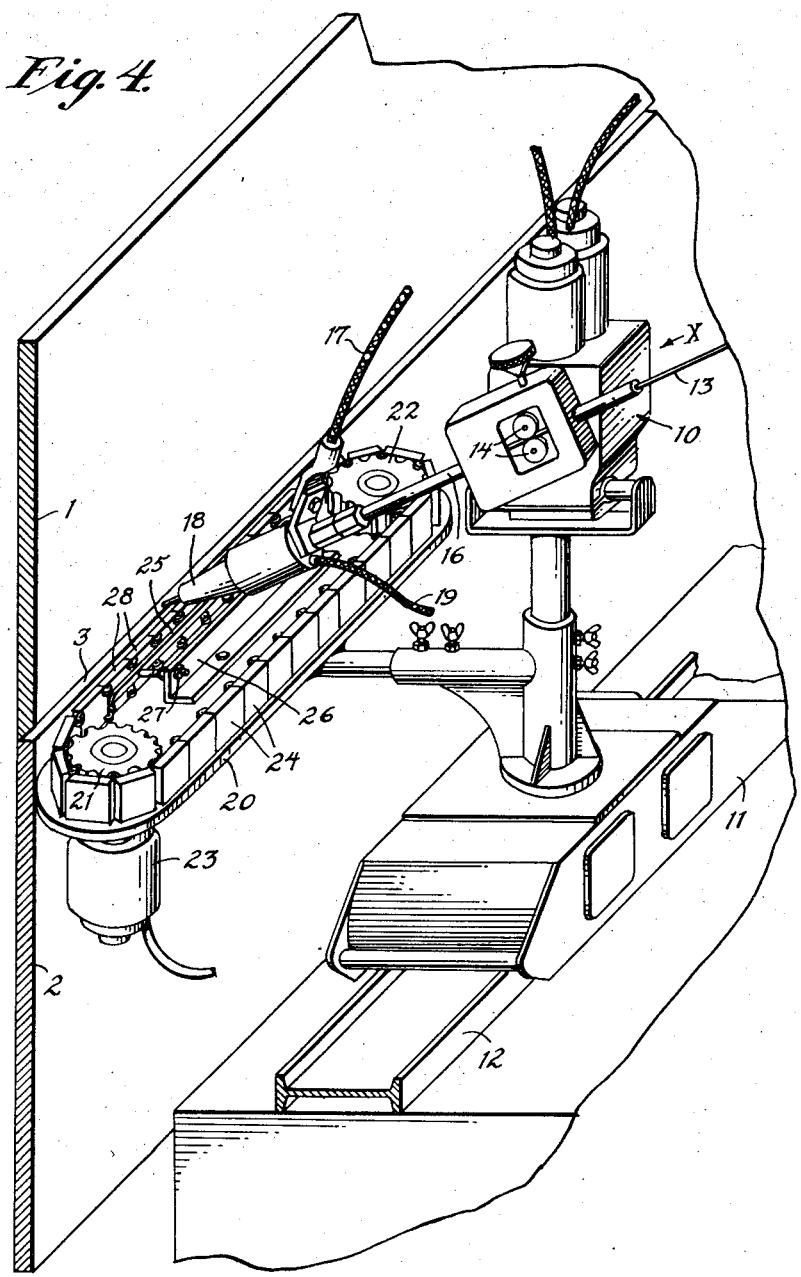
Figure 4 is a perspective view of part of an automatic machine as per the invention, in the position it occupies while welding with the assistance of an endless chain carrying sections of copper strips as described above.
Figure 5:
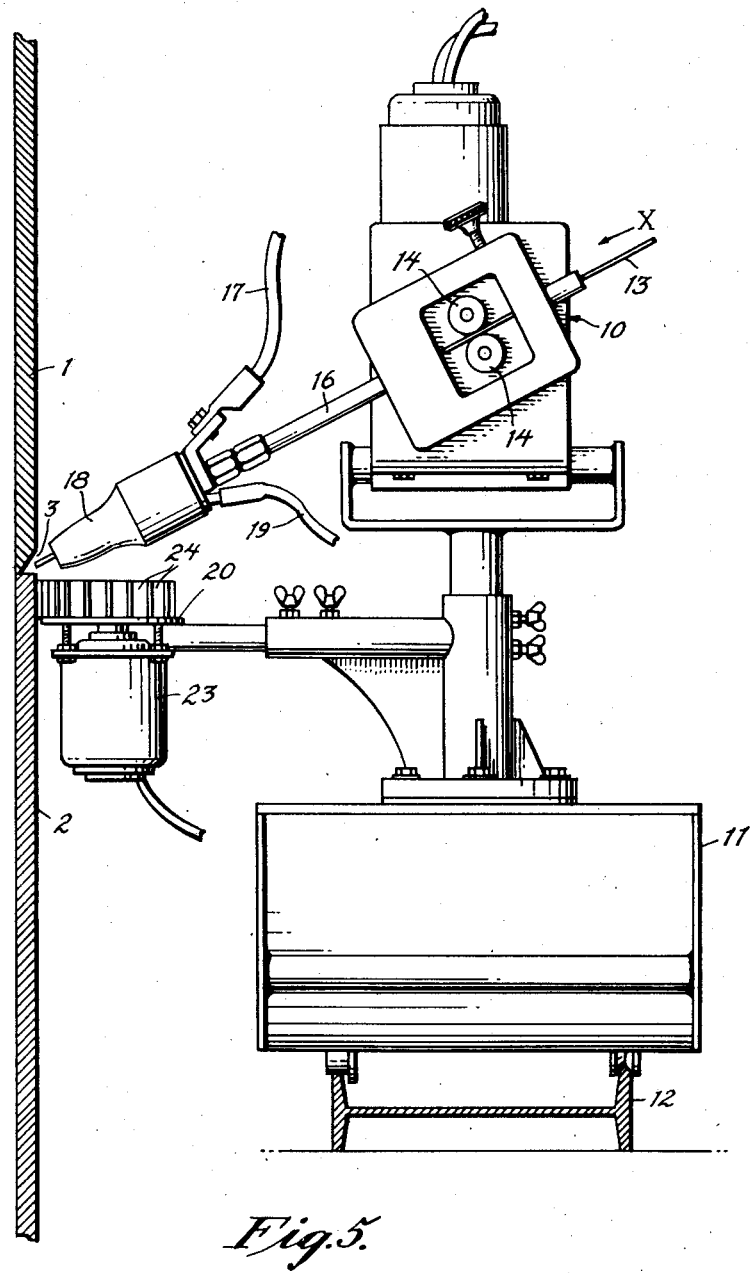
Figure 5 is a front view of the machine shown in Figure 4.
Figure 6:
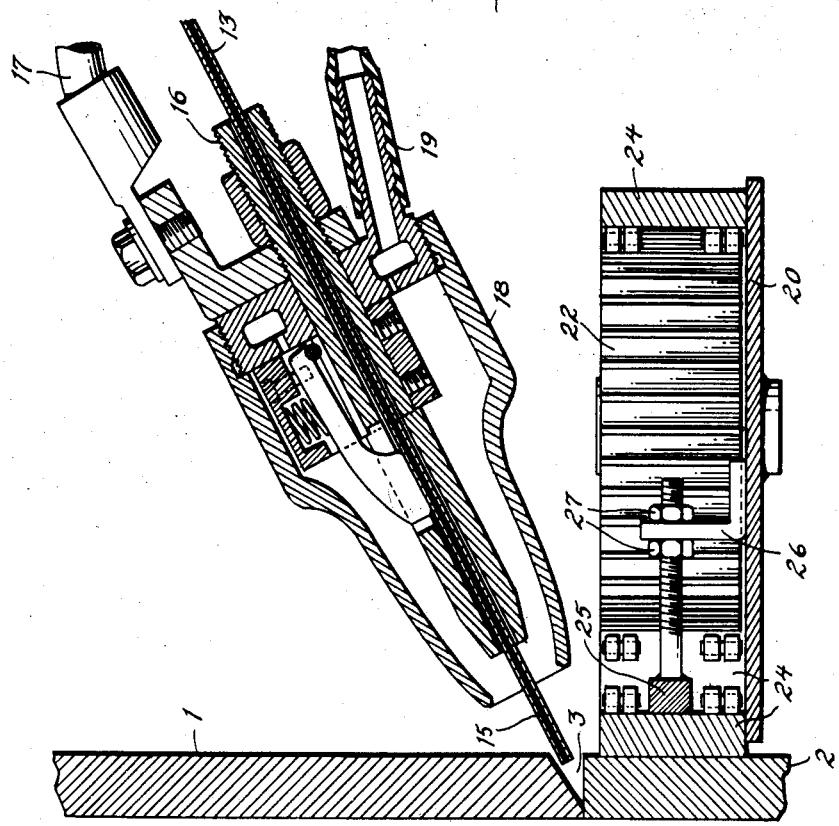
Figure 6 shows, at a larger scale, a vertical section of part of the machine of Figures 4 and 5, in the vicinity of the welding site.

The machine shown in Figures 4 to 6 included a welding head 10 carried by a movable support 11 consisting, for instance, in a carriage guided upon an I beam 12. This carriage can move parallel to the joint 3 of the vertical plates 1 and 2. Composite steel wire 13 is fed by feed rolls 14 in the direction of arrow X. This composite wire contains a core 15 (Figure 6) such as described previously. It can be tilted at will with respect to the head 10. It moves through a wire-guide 16 receiving the welding current from a conductor 17, then the wire moves into a nozzle 18 receiving carbon dioxide by a hose 19. The jet of carbon dioxide is shot into the joint 3 at the point where the arc is struck between the wire 13 and the plates to be welded.

In the machine shown, the carriage 11 carrying the head 10 also carries a plate 20 upon which two sprockets 21 and 22 are mounted. The first of said sprockets may be rotated by an electric motor 23 and a speed reducer. It actuates a chain consisting of a number of plates 24 hinged to each other. These plates are pressed against the lower plate 2 by means of a shoe 25 adjustable in position, with respect to a fixed support 26, by means of nuts 27. The upper face 28 of plates 24 is slightly under the lower lip of joint 3 to be welded. Said plates operate while welding, in the same manner as movable strip 6 shown in Figures 1 to 3.

During the welding operation, these plates locate themselves in succession under the welding site where they support and cool the liquid slag.

The electrode 13 shown in Figure 4 comprises an outer metallic shell 29 having some of its parts bent inward to form fins 30 distributed among the materials of the granulated core 15.

This core, as said above, consists in a mixture of deoxidizers such as ferroalloys and slag-forming materials. The weight of this core is kept between 24 and 42% of the weight of the metallic portion of the electrode, which consists in the shell 29 and the fins 30.

It will be noted that these fins form a single and uninterrupted electrical conductor with the shell 29. Thus the fins distribute the current of the arc through the entire cross-section of the electrode, without limiting the current to the shell only, as in the case of the tubular electrode herebefore mentioned.

Such an electrode made by folding and wrapping around itself a metallic strip is known per se, but it has never been used except with an arc in the open air. On the other hand, when using in a carbon dioxide atmosphere a fusible electrode comprising a granulated core as described, enclosed in an outer shell having no inside projections or fins, it would not be obvious to the investigator that fins in the proportions mentioned in the process of the invention could reduce very materially the spatter and sputter.

In the electrode as per Figure 8, the internal metallic fins take the shape of radial projections 30.

In the electrode as per Figure 9, two main webs 30 each cross the other along two perpendicular diameters. Each branch of the cross is itself crossed by a small strip 30' projecting from both faces of the branch. These elements are held together and to the outside shell 29 by welds 31.

In the electrode of Figure 10, two strips 30 are wrapped in the shape of intermingled scrolls welded to the shell 29. Two radial fins 30'' also welded to the shell 29 project into the core 15 to reach the scrolls near their middle point.

Other forms of realization may be imagined provided they conform to the conditions proper to this invention and in particular to the ratios between the weight of the outer shell and that of the internal fins, between the weight of the granulated core and that of the metallic portion, and optionally between the cumulative extension of the internal fins and the outer shell periphery.

It is obvious that the invention is not exclusively limited to the forms of execution shown, and that many variations can be brought to the form, disposition and construction of some elements used to realize the invention, within the scope of the present invention, on condition that these changes do not contradict the object of each of the following claims.

In view of my invention and disclosure variations and modifications to meet individual whim or particular need will doubtless become evident to others skilled in the art, to obtain all or part of the benefits of my invention without copying the process and apparatus shown, and I, therefore, claim all such insofar as they fall within the reasonable spirit and scope of my claims.

Having thus described my invention what I claim as new and desire to secure by Letters Patent is:

1. A process for automatic electric arc welding, which comprises establishing and maintaining an electric arc between work and a bare, continuous fusible metallic electrode, said electrode having a shell containing a core which composes 24 to 42 percent by weight of the coherent metallic portion of the electrode, said core containing a granulated mixture of deoxidizers in the proportion of 4 to 20 percent and of vitreous granules of slag-forming materials in the proportion of 75 to 96 percent by weight of the core, said slag-forming materials comprising 60 to 85 percent $TiO_2$, 4 to 20 percent $MnO$, and 8 to 25 percent $SiO_2$ by weight of the slag forming materials, surrounding the arc with an atmosphere of carbon dioxide, advancing the electrode into the arc while maintaining electric contact with the exterior of the electrode, and relatively moving the arc with respect to the work.

2. A process for automatic electric arc welding, which comprises establishing and maintaining an electric arc between work and a bare, continuous fusible metallic electrode, said electrode having a shell containing a core, which composes 24 to 42 percent by weight of the coherent metallic portion of the electrode, said core containing a granulated mixture of deoxidizers in the proportion of 12 percent low-carbon ferro-manganese containing 80 percent by weight of manganese and of vitreous granules of slag-forming materials in the proportion of 88 percent by weight of the core, said slag-forming vitreous granules being composed of 66 percent $TiO_2$, 6 percent $MnO$, 19 percent $SiO_2$ and 9 percent of $$(FeO + Al_2O_3 + CaO + MgO + Na_2O + K_2O)$$

by weight of the slag-forming materials, surrounding the arc with an atmosphere of carbon dioxide, advancing the electrode into the arc while maintaining electric contact with the exterior of the electrode and relatively moving the arc with respect to the work.

3. A process for automatic electric arc welding, which comprises establishing and maintaining an electric arc between work and a bare, continuous fusible metallic electrode, said electrode having an outer shell and internal metallic fins whose weight is greater than that of the outer shell and between which is pressed a granulated core mixture which composes 24 to 42 percent by weight of the shell and fins, said core mixture containing deoxidizers in the proportion of 4 to 20 percent and vitreous granules of slag-forming materials in the proportion of 75 to 96 percent by weight of the core, said slag-forming materials comprising 60 to 85 percent $TiO_2$, 4 to 20 percent $MnO$ and 8 to 25 percent $SiO_2$ by weight of the slag-forming materials, surrounding the arc with an atmosphere of carbon dioxide, advancing the electrode into the arc while maintaining electric contact with the exterior of the electrode, and relatively moving the arc with respect to the work.

4. A process for automatic electric arc welding, which comprises establishing and maintaining an electric arc between work and a bare, continuous fusible metallic electrode, said electrode having an outer shell and interior metallic fins whose weight is greater than that of the outer shell, whose cumulated extension is greater than half the periphery of the shell and between which is pressed a granulated core mixture which composes 24 to 42 percent by weight of the shell and fins, said core mixture containing deoxidizers in the proportion of 4 to 20 percent and vitreous granules of slag-forming materials in the proportion of 75 to 96 percent by weight of the core, said slag-forming materials comprising 60 to 85 percent $TiO_2$, 4 to 20 percent $MnO$ and 8 to 25 percent $SiO_2$ by weight of the slag-forming materials, surrounding the arc with an atmosphere of carbon dioxide, advancing the electrode into the arc while maintaining electric contact with the exterior of the electrode and relatively moving the arc with respect to the work.

5. A bare, continuous fusible metallic electrode for automatic electric arc welding comprising an outer metallic shell, internal metallic fins, whose weight is greater than that of the outer shell and which electrically connect with the outer shell, a granulated core mixture pressed between said fins, which composes 24 to 42 percent by weight of the shell and fins, said granulated mixture containing deoxidizers in the proportion of 4 to 20 percent and vitreous granules of slag-forming materials in the proportion of 75 to 96 percent by weight of the core, said slag-forming materials being composed of 60 to 85 percent $TiO_2$, 4 to 20 percent MnO and 8 to 25 percent $SiO_2$ by weight of the slag-forming materials.

6. A bare, continuous fusible metallic electrode for automatic electric arc welding comprising an outer shell, internal metallic fins from the outer shell, whose weight is greater than that of the outer shell, whose cumulated extension is greater than half the periphery of the shell, a granulated mixture pressed between said fins and composing 24 to 42 percent by weight of the shell and fins, said granulated mixture containing deoxidizers in the proportion of 4 to 20 percent and vitreous granules of slag-forming materials in the proportion of 75 to 96 percent by weight of the granulated mixture, said slag-forming materials comprising 60 to 85 percent $TiO_2$, 4 to 20 percent MnO and 8 to 25 percent $SiO_2$ by weight of the slag-forming materials.

References Cited in the file of this patent

UNITED STATES PATENTS

| | | |
|---|---|---|
| 1,374,711 | Armor | Apr. 12, 1921 |
| 1,501,266 | Brace | July 15, 1924 |
| 2,200,737 | Clapp | May 14, 1940 |
| 2,490,179 | Van Der Willigen et al. | Dec. 6, 1949 |
| 2,504,867 | Muller | Apr. 18, 1950 |
| 2,544,711 | Mikhalapov | Mar. 13, 1951 |
| 2,713,106 | Arnold | July 12, 1955 |
| 2,755,211 | Jackson et al. | July 17, 1956 |
| 2,781,441 | Ballentine et al. | Feb. 12, 1957 |

FOREIGN PATENTS

| | | |
|---|---|---|
| 527,009 | Belgium | Sept. 6, 1954 |
| 1,142,934 | France | Apr. 8, 1957 |

OTHER REFERENCES

"Welding Journal" (Danhier), April 1947, page 252–S.